(12) United States Patent
Koreeda et al.

(10) Patent No.: US 8,419,291 B2
(45) Date of Patent: Apr. 16, 2013

(54) ADAPTER SYSTEM

(75) Inventors: Yuichi Koreeda, Tokyo (JP); Osamu Hashiguchi, Tokyo (JP); Naoki Katagiyama, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 359 days.

(21) Appl. No.: 12/806,321

(22) Filed: Aug. 10, 2010

(65) Prior Publication Data

US 2011/0081798 A1    Apr. 7, 2011

(30) Foreign Application Priority Data

Oct. 1, 2009  (JP) ................................ 2009-229888

(51) Int. Cl.
*G02B 6/38* (2006.01)

(52) U.S. Cl.
USPC ............................................. 385/56; 385/58

(58) Field of Classification Search ............ 385/56, 385/58
See application file for complete search history.

(56) References Cited

U.S. PATENT DOCUMENTS

| 5,082,344 | A | * | 1/1992 | Mulholland et al. | 385/60 |
|---|---|---|---|---|---|
| 5,274,729 | A | * | 12/1993 | King et al. | 385/134 |
| 5,717,801 | A | * | 2/1998 | Smiley | 385/60 |
| 5,937,121 | A | * | 8/1999 | Ott et al. | 385/59 |
| 6,151,432 | A | * | 11/2000 | Nakajima et al. | 385/60 |
| 6,224,270 | B1 | * | 5/2001 | Nakajima et al. | 385/78 |
| 6,334,715 | B1 | * | 1/2002 | So et al. | 385/60 |
| 6,347,888 | B1 | * | 2/2002 | Puetz | 385/53 |
| 6,533,468 | B2 | * | 3/2003 | Nakajima et al. | 385/78 |
| 6,612,750 | B1 | * | 9/2003 | Bull et al. | 385/65 |
| 6,634,796 | B2 | * | 10/2003 | de Jong et al. | 385/56 |
| 7,985,027 | B2 | * | 7/2011 | Lewallen et al. | 385/78 |
| 2001/0012428 | A1 | * | 8/2001 | Nakajima et al. | 385/78 |
| 2008/0175546 | A1 | * | 7/2008 | Lu et al. | 385/92 |
| 2009/0148101 | A1 | * | 6/2009 | Lu et al. | 385/56 |
| 2010/0002999 | A1 | * | 1/2010 | Katagiyama et al. | 385/134 |
| 2010/0296779 | A1 | * | 11/2010 | Lu et al. | 385/72 |

FOREIGN PATENT DOCUMENTS

| CN | 1175002 A | * | 3/1998 |
|---|---|---|---|
| CN | 1250527 A | * | 4/2000 |
| CN | 101535858 | | 9/2009 |
| JP | 2001-021763 | | 1/2001 |
| WO | WO 99/39229 | * | 8/1999 |

OTHER PUBLICATIONS

Chinese Office Action dated Jul. 27, 2012 in Chinese Patent Application No. 201010293690.6 along with an English translation of same.

* cited by examiner

*Primary Examiner* — Michelle R Connelly
(74) *Attorney, Agent, or Firm* — Collard & Roe, P.C.

(57) ABSTRACT

An adapter system has a standard adapter for intercoupling two first type connectors, and an interface converter for attachment to the standard adapter. Each first type connector has a first connection end formed with two engaged portions. The standard adapter has two first openings and two engaging portions within the first openings engaging the two engaged portions so that the standard adapter retains the first connection end when the first type connector is inserted in the first opening. The interface converter is attached inside the first opening to convert the first opening to a second opening having a second interface for a second connection end of a second type connector different in shape from the first connection end and has two receptacles for receiving the engaging portions.

8 Claims, 6 Drawing Sheets

ADAPTER SYSTEM

CROSS REFERENCE TO RELATED APPLICATIONS

Applicants claim priority under 35 U.S.C. §119 of Japanese Patent Application No. JP2009-229888 filed Oct. 1, 2009.

BACKGROUND OF THE INVENTION

This invention relates to an adapter system which is able to couple different types of connectors with each other.

For example, this type of an adapter system is disclosed in JP-A 2001-21763, the contents of which are incorporated herein by reference. The adapter system of JP-A 2001-21763 includes plural members. The plural members are screwed clockwise or counterclockwise to be attached to or to be released from each other. The adapter system is able to couple two different types of connectors with each other.

The adapter systems of JP-A 2001-21763 has a complicated structure to enable the plural members to be attached to each other. It is difficult to reduce the unit price of the adapter system.

SUMMARY OF THE INVENTION

It is therefore an object of the present invention to provide an adapter system which has a simple structure to couple various types of connectors with each other.

One aspect of the present invention provides an adapter system having a standard adapter configured to couple two first type connectors with each other, and an interface converter configured to be attached to the standard adapter. Each of the first type connectors has a first connection end. The first connection end is formed with two engaged portions. The standard adapter has two first openings on opposite sides thereof in a first direction and two engaging portions within each of the first openings. The first opening has a first interface for the first connection end. The two engaged portions of the first type connector oppose with each other in a second direction perpendicular to the first direction. The two engaged portions of the first type connector is engaged with the engaging portions of the first opening, so that the standard adapter retains the first connection end when the first type connector is inserted in the first opening. An interface converter is configured to be attached inside the first opening so as to convert the first opening to a second opening having a second interface for a second connection end of a second type connector. The second connection end is different in shape from the first connection end. The interface converter has two receptacles which are receivable the engaging portions of the standard adapter, respectively, when the interface converter is attached to the standard adapter.

An appreciation of the objectives of the present invention and a more complete understanding of its structure may be had by studying the following description of the preferred embodiment and by referring to the accompanying drawings.

Figure 1:
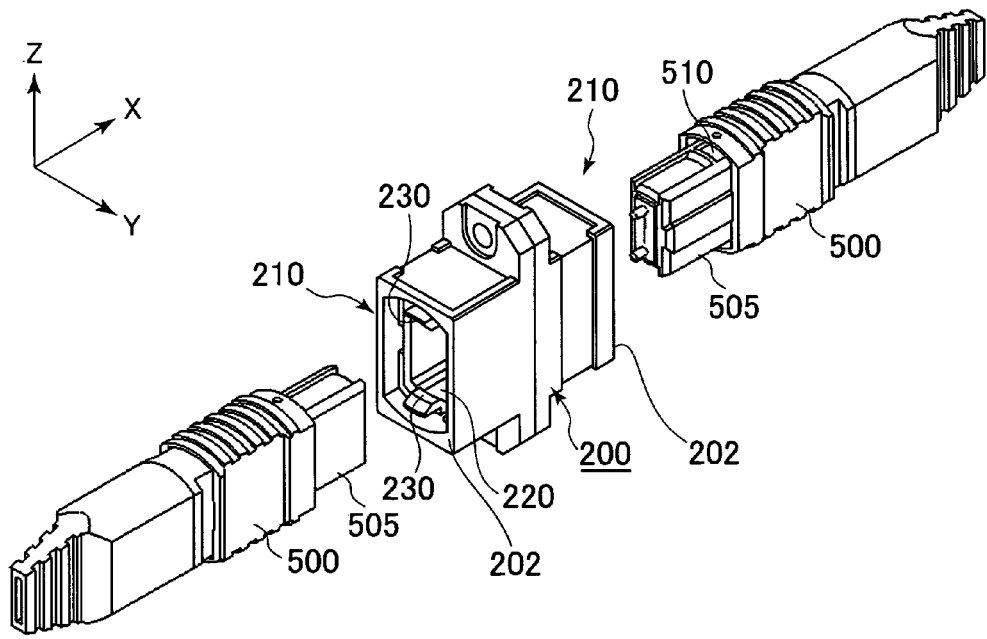
FIG. 1 is a perspective view showing a standard adapter according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 2:
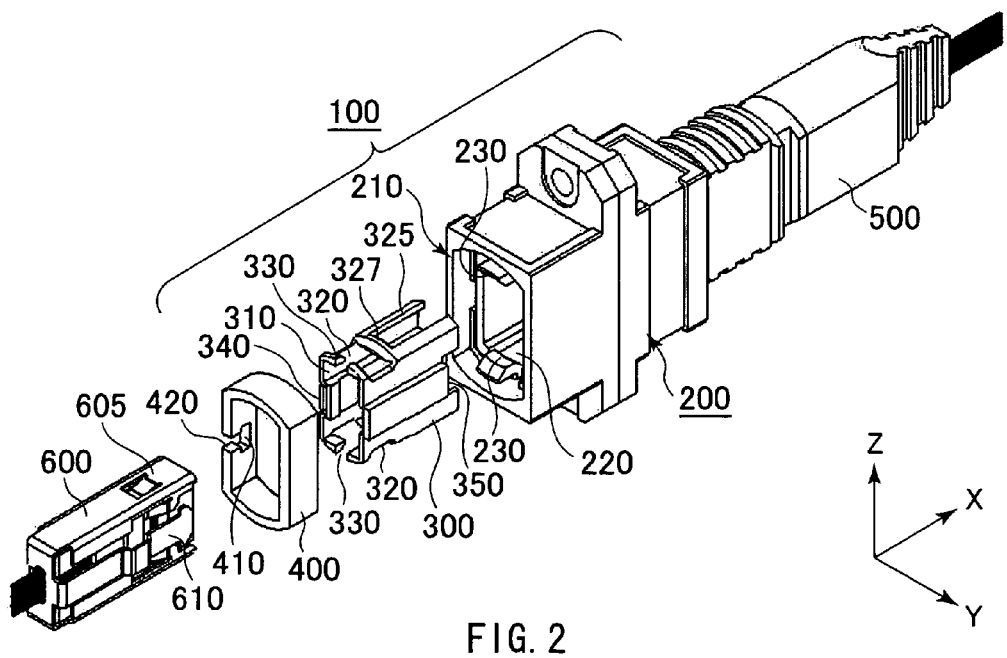
FIG. 2 is a partially-exploded, perspective view showing an adapter system according to an embodiment of the present invention.
Figure 3:
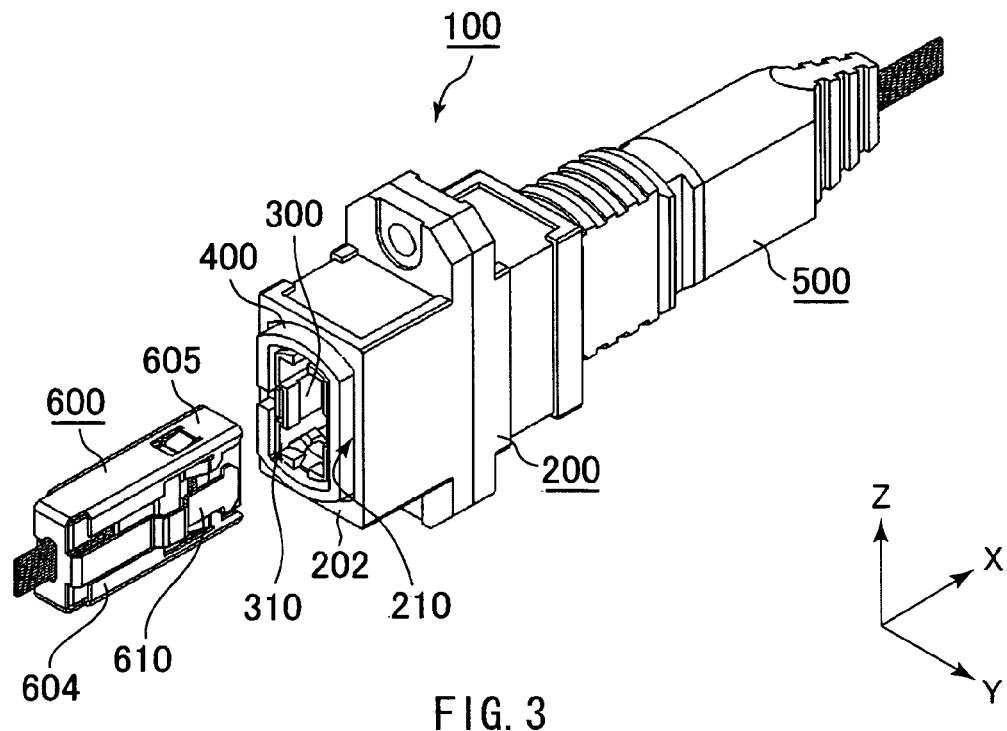
FIG. 3 is a perspective view showing the adapter system of FIG. 2.

Referring to FIGS. 1 to 3, an adapter system 100 according to an embodiment of the present invention has a standard adapter 200, an interface converter 300 and a movement regulator 400 and is configured to couple a first type connector 500 with a second type connector 600. In the present embodiment, the first type connector 500 and the second type connector 600 are optical connectors to connect optical fibers, but they are different in shapes as shown in the figures. The first type connector 500 has a first connection end 505. The first connection end 505 of the first type connector 500 is formed with two depressions (engaged portions) 510 on upper and lower surfaces thereof, respectively. The depressions 510 are depressed in the Z-direction. The second type connector 600 has a second connection end 605. The second connection end 605 is formed with an engaging portion 610. The second connection end 605 is different in shape from the first connection end 505.

As shown in FIGS. 1 to 3 and 6, the standard adapter 200 is a standardized adapter configured to couple two first type connectors 500 with each other and is provided with two end faces 202 and two first openings 210. The first openings 210 are positioned at opposite sides of the standard adapter 200 in the X-direction (first direction) and open in the X-direction. The first opening 210 has a first interface for the first connection end 505 of the first type connector 500. The standard adapter 200 has two arms 220 extending along the X-direction within each of the first openings 210. These two arms 220 are provided with two protrusions (engaging portions) 230 formed on ends thereof, respectively. In other words, the standard adapter has four arms 220 and four protrusions 230 in total. In each of the first openings 210, two protrusions 230 protrude inwards in the Z-direction (second direction) and oppose with each other in the Z-direction. When the first type connector 500 is inserted in the first opening 210 along the X-direction to be connected to the standard adapter 200, the depressions 510 of the first type connector 500 are engaged with the protrusions 230 of the first opening 210 so that the standard adapter 200 retains the first connection end 505 within the first opening 210.

As shown in FIGS. 2 to 4 and 6, the interface converter 300 has a second opening 310 which has a second interface for the second connection end 605 of the second type connector 600. The interface converter 300 is attached inside the first opening 210 and converts the first opening 210 of the first interface into the second opening 310 of the second interface. The interface converter 300 has a shape like a lane of a track when viewed along the X-direction. The interface converter 300 has front edges 302 and rear edges 304. The front edges 302 and the rear edges 304 are located at opposite sides of the interface converter 300 in the X-direction. The interface converter 300 has two curved surfaces opposite to each other in the Z-direction. The curved surfaces of the interface converter 300 are formed with receptacles 320, respectively. The receptacles 320 are positioned nearer the front edges 302 than the rear edges 304. The receptacles 320 correspond to the depressions 510 of the first type connector 500. The receptacles 320 receive the protrusions 230 of the standard adapter 200, respectively, when the interface converter 300 is inserted in the first opening 210 of the standard adapter 200 and attached to the standard adapter 200. In the present embodiment, each of the receptacles 320 is formed as a through hole which pierces through the interface converter 300 in the Z-direction. The interface converter 300 has two guide portions 325 and two protruding portions 327 between the rear edges 304 and the receptacles 320. Each of the guide portions 325 is formed as a channel extending from the rear edge 304 toward the receptacle 320. Each of the protruding portions 327 is positioned between the guide portion 325 and the receptacle 320 and protrudes in the Z-direction so that the guide portion 325 and the receptacle 320 are separated from each other. The guide portions 325 guide the respective protrusions 230 toward the respective receptacles 320 while preventing the arms 220 from pressured unnecessarily, when the interface converter 300 is inserted in the standard adapter 200. During insertion of the interface converter 300 into the first opening 210, the protrusions 230 ride on the protruding portions 327 and are then received by the receptacles 320. The protrusions 230 are engaged with the respective protruding portions 327 so that the interface converter 300 can be kept at a predetermined position in the standard adapter 200. In addition, since the interface converter 300 of the present embodiment is formed with the receptacles 320 corresponding to the depressions 510 of the first type connector 500, the interface converter 300 can be retained properly in the existing standard adapter 200 without modifying the structure of the standard adapter 200. Therefore, the structure of the adapter system 100 can be made simple. As shown in FIG. 3, the interface converter 300 of the present embodiment partially projects out of the standard adapter 200 in the X-direction beyond the end face 202 when the interface converter 300 is attached to the standard adapter 200 and is positioned at the predetermined position. Therefore, the interface converter 300 can be removed from the standard adapter 200 by relatively easy operations.

Figure 4:
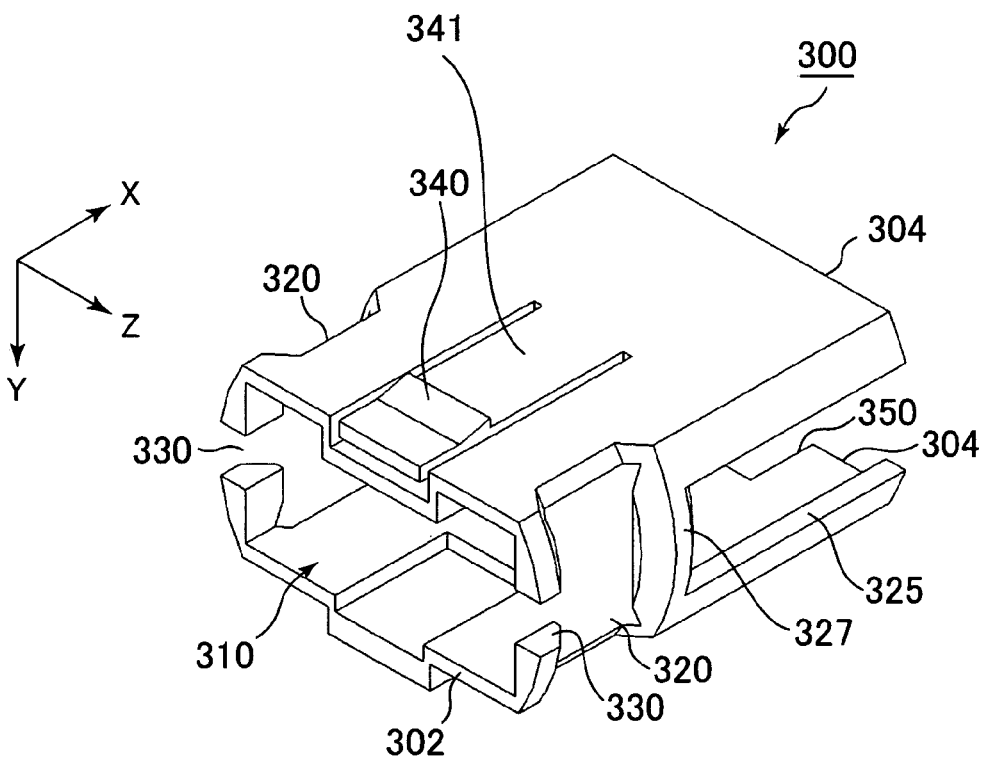
FIG. 4 is a perspective view showing an interface converter included in the adapter system of FIG. 2.
Figure 7:
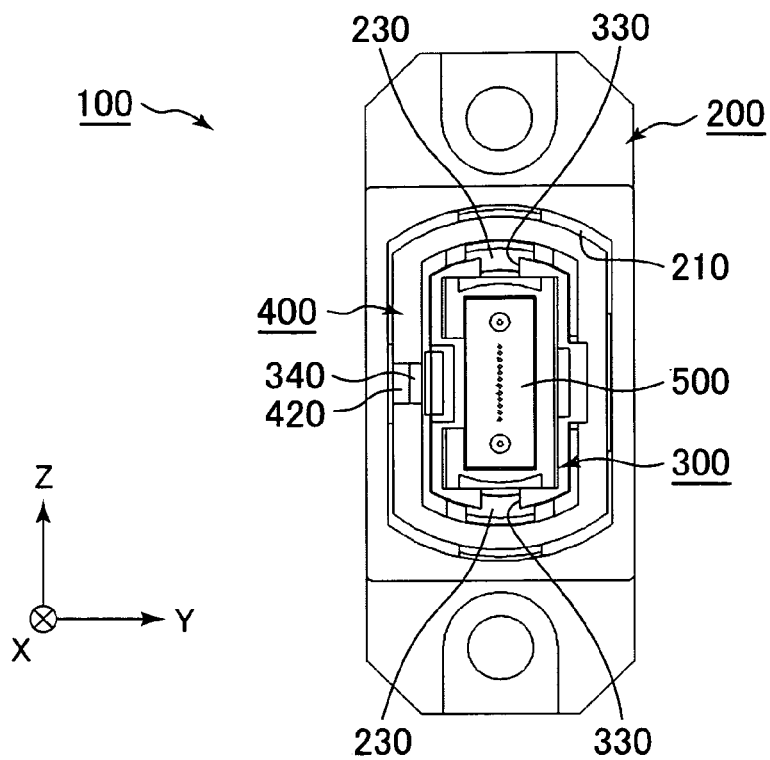
FIG. 7 is a front view showing the adapter system of FIG. 3.

The interface converter 300 is formed with two release grooves 330, an engaging part 340 and an engaged portion 350. The release grooves 330 extend from the respective front edges 302 of the interface converter 300 to the respective receptacles 320 along the X-direction. The release grooves 330 are used to force the respective protrusions 230 to come off the respective receptacles 320. As shown in FIG. 7, when the adapter system 100 is viewed along the X-direction, the protrusions 230 received in the receptacles 320 are partially visible through the release grooves 330. As shown in FIG. 4, the engaging part 340 is a projection which is formed on a spring portion 341 and projects outwardly in the Y-direction (third direction). The engaging part 340 is movable in the Y-direction. The engaged portion 350 is formed in the interface converter 300 and recessed from the rear edge 304 toward the front edge 302 in the X-direction so as to be engaged with the engaging portion 610 of the second type connector 600 when the second connection end 605 of the second type connector 600 is inserted in the second opening 310 of the interface converter 300.

Figure 5:
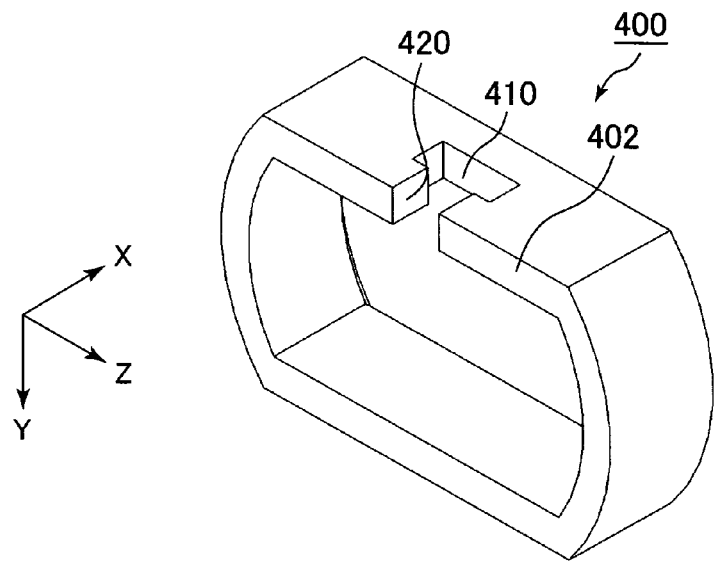
FIG. 5 is a perspective view showing a movement regulator included in the adapter system of FIG. 2.
Figure 6:
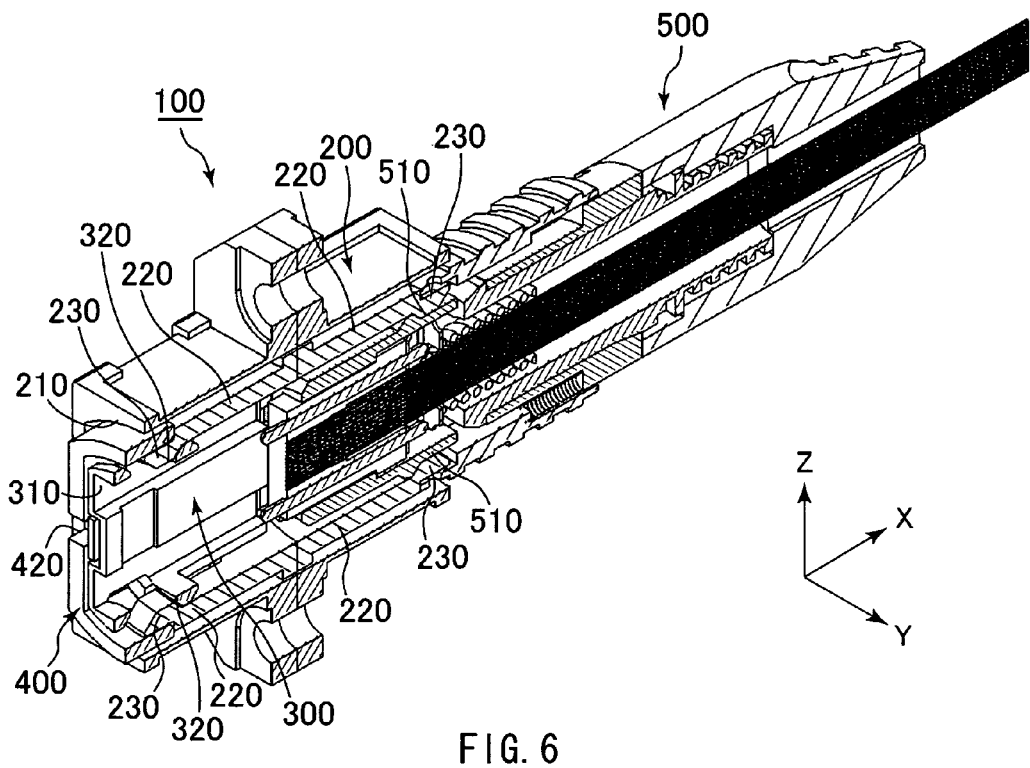
FIG. 6 is a cross section perspective view showing the adapter system of FIG. 3.

As shown in FIGS. 2, 3, 5 and 6, the movement regulator 400 is configured to prevent the protrusions 230 from unintentionally coming off the respective receptacles 320 along the Z-direction when the protrusions 230 are received by the receptacles 320. The interface converter 300 is secured to the standard adapter 200 more firmly by the movement regulator 400. The movement regulator 400 of the present embodiment has a loop-like shape. The movement regulator 400 is attached to the interface converter 300 after the receptacles 320 receive the protrusions 230. As shown in FIG. 6, the movement regulator 400 is inserted into a gap between the standard adapter 200 and the interface converter 300 so as to be positioned over the arms 220 and to enclose in part the interface converter 300. Thus, movements of the protrusions 230 in the Z-direction are regulated.

As shown in FIG. 5, the movement regulator 400 of the present embodiment is also formed with a hole 410. The hole 410 pierces through the movement regulator 400 in the Y-direction. In the present embodiment, when the movement regulator 400 is attached to the interface converter 300, the engaging part 340 of the interface converter 300 is engaged with the hole 410 of the movement regulator 400. The attached state of the movement regulator 400 to the interface converter 300 is kept by the engagement of the engaging part 340 with the hole 410. As shown in FIG. 3, the movement regulator 400 partially projects out of the standard adapter 200 in the X-direction beyond the end face 202 when the movement regulator 400 is attached to the interface converter 300. Therefore, the movement regulator 400 can be removed from the standard adapter 200 by relatively easy operations.

As shown in FIGS. 2 and 5, the movement regulator 400 is further formed with a front edge 402 and a release gap 420. The release gap 420 extends along the X-direction from the front edge 402 to the hole 410. As shown in FIG. 7, when the adapter system 100 is viewed along the X-direction, engaging part 340 of the interface converter 300 engaged with the hole 410 is partially visible through the release gap 420.

When the engaging part 340 is engaged with the hole 410 after the protrusions 230 are received by the receptacles 320, the members of the adapter system 100 are interlocked with each other and kept in the interlocked status. On the other hand, as shown in FIGS. 8 and 9, the adapter system 100 is easily disassembled by using a release tool 700.

Figure 8:
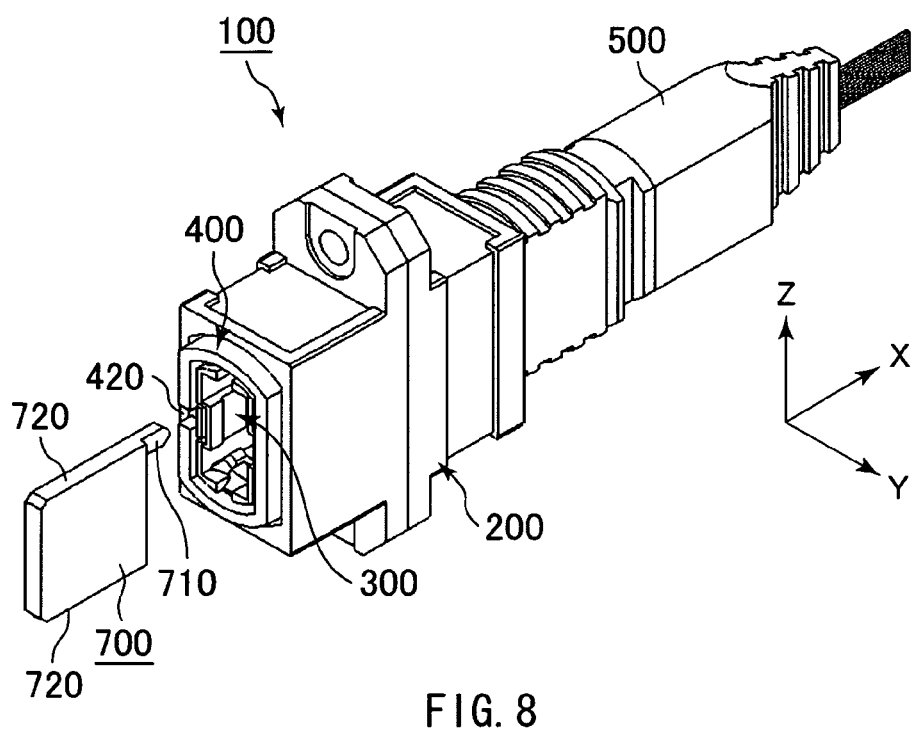
FIG. 8 is a perspective view showing a step of releasing the movement regulator from the interface converter of the adapter system of FIG. 3 by using a release tool.
Figure 9:
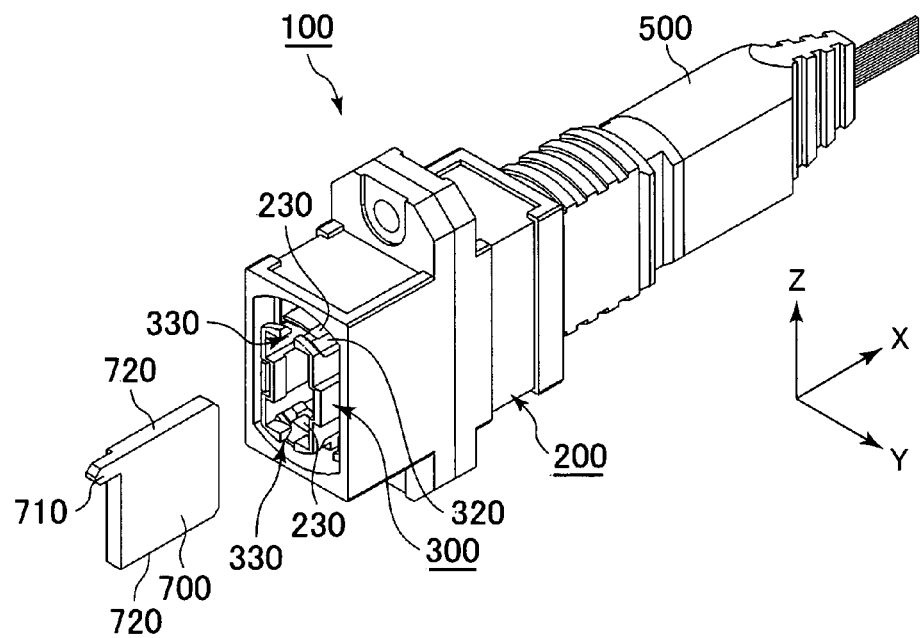
FIG. 9 is a perspective view showing a step of releasing the interface converter from the standard adapter of the adapter system of FIG. 3 by using the release tool.

Referring to FIGS. 8 and 9, the release tool 700 has a shape like a rectangular flat board. The release tool 700 is formed with a release tab 710. The release tab 710 projects outwardly from a side of the rectangle. The release tool 700 has two sides perpendicular to the side on which the release tab 710 is formed, and these two sides serve as two pushing portions 720.

Next explanation is made about disassembly of the adapter system 100 with reference to FIGS. 8 and 9. As shown in FIG. 8, the release tab 710 is inserted into the release gap 420 so that the engaging part 340 is moved out of the hole 410 toward the Y-direction. Then, the movement regulator 400 is pulled out of and removed from the interface converter 300. Next, as shown in FIG. 9, the pushing portions 720 are inserted into the respective release grooves 330 so as to push the respective protrusions 230 at the same time. The two protrusions 230 are moved together in the Z-direction outwardly so as to come off the respective receptacles 320. Then, the interface convert 300 is pulled out of and disengaged from the standard adapter 200. As described above, the adapter system 100 of the present embodiment is provided with the release gap 420 and the release grooves 330 so that the adapter system 100 can be simply disassembled by using a tool such as the release tool 700.

Although the adapter system 100 is provided with the movement regulator 400 and the interface converter 300, the present invention is not limited thereto. For example, the second type connector 600 may be formed with arms to prevent the protrusions 230 from coming off the respective receptacles 320. In this case, the movement regulator 400 is not required.

Figure 10:
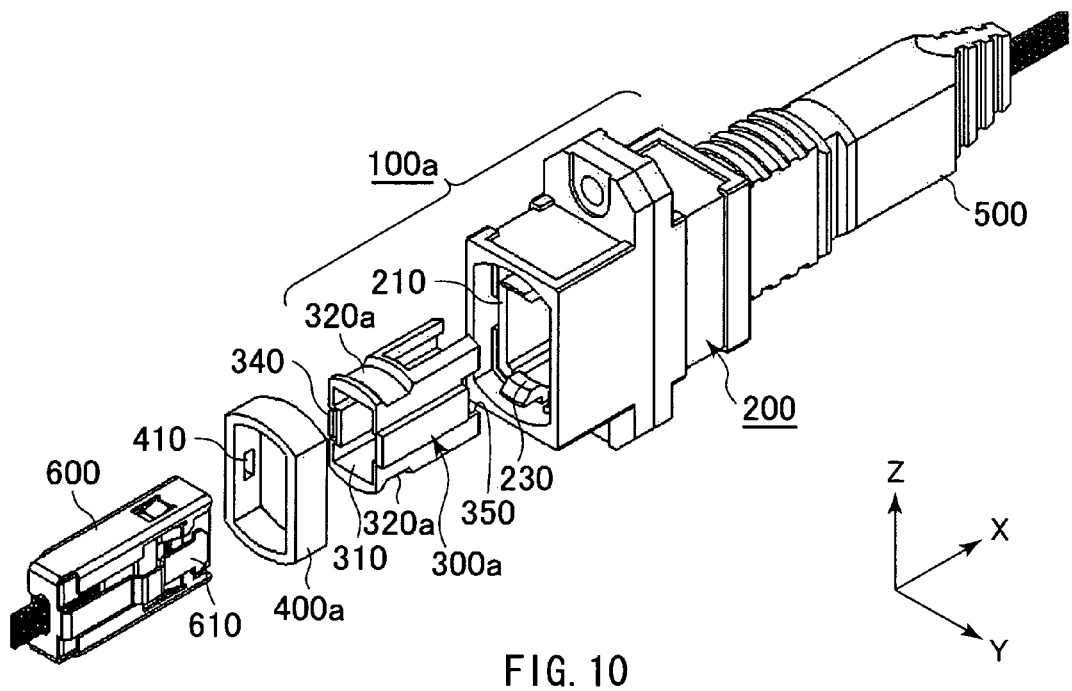
FIG. 10 is a partially-exploded, perspective view showing a modification of the adapter system of FIG. 3.
Figure 11:
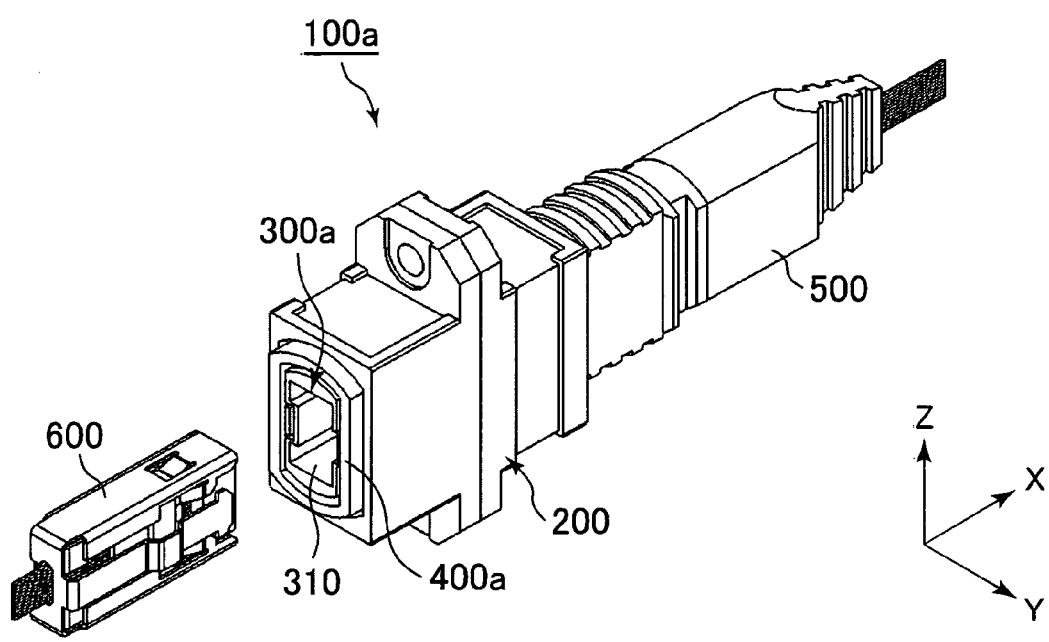
FIG. 11 is a perspective view showing the adapter system of FIG. 10.

Although the interface converter 300 and the movement regulator 400 are released by using the release tool 700 in the above-mentioned embodiment, the interface converter 300 and the movement regulator 400 may be released by using tools other than the release tool 700. Moreover, as shown in FIGS. 10 and 11, an interface converter 300a without the release grooves and a movement regulator 400a without the release gap may be used. As shown in FIG. 10, the receptacles 320a may be formed in recess-like shapes. If the movement regulator 400a could not be released unintentionally from the interface converter 300a, the hole 410 may be omitted. In this case, the engaging part 340 may be omitted, too.

In the embodiments described above, the engaging portions 230 of the standard adapter 200 have protrusions, while the engaged portions 510 of the first type connector 500 and the receptacles 320 of the interface converter 300 are formed as depressions, holes, openings, and so on. The engaging portions 230 may be formed as holes, depressions, openings, and so on, while the engaged portions 510 and the receptacles 320 may have protrusions.

The present application is based on a Japanese patent application of JP2009-229888 filed before the Japan Patent Office on Oct. 1, 2009, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An adapter system comprising:
a standard adapter configured to couple two first type connectors with each other, each of the first type connectors having a first connection end, the first connection end being formed with two engaged portions, the standard adapter having two first openings on opposite sides thereof in a first direction and two engaging portions within each of the first openings, the first opening having a first interface for the first connection end, the two engaging portions of the standard adapter opposing with each other in a second direction perpendicular to the first direction, the two engaged portions of the first type connector being engaged with the engaging portions of the first opening, so that the standard adapter retains the first connection end when the first type connector is inserted in the first opening; and
an interface converter configured to be attached inside the first opening so as to convert the first opening to a second opening having a second interface for a second connection end of a second type connector, the second connection end being different in shape from the first connection end, the interface converter having two receptacles which are receivable the engaging portions of the standard adapter, respectively, when the interface converter is attached to the standard adapter.

2. The adapter system as recited in claim 1, further comprising
a movement regulator configured to regulate movements of the engaging portions along the second direction so as to prevent the engaging portions from coming off the respective receptacles.

3. The adapter system as recited in claim 2, wherein
the standard adapter is provided with two arms for each of the first openings, each of the arms extending along the first direction,
the engaging portions are formed on the arms of the first opening, respectively, each of the engaging portions having a protrusion protruding inwards in the second direction, and
the movement regulator has a loop-like shape, the movement regulator being positioned over the arms and enclosing in part the interface converter when the engaging portions are received by the receptacles, so that the movements of the engaging portions are regulated.

4. The adapter system as recited in claim 3, wherein
the interface converter has a engaging part projecting outwardly in a third direction perpendicular to the first direction,
the movement regulator is formed with a hole and a release gap,
the hole pierces through the movement regulator in the third direction, the engaging part being engaged with the hole when the movement regulator is attached to the interface converter, and
the release gap extends from an edge of the movement regulator to the hole to be used to release the engagement of the engaging part with the hole.

5. The adapter system as recited in claim 3, wherein
each of the receptacles pierces through the interface converter in the second direction,
the interface converter is formed with two release grooves, and
the two release grooves extend from an edge of the interface converter to the respective receptacles to be used to force the respective engaging portions to come off the respective receptacles.

6. The adapter system as recited in claim 3, wherein
the interface converter is formed with two guide portions, and
guide portions guide the respective engaging portions of the first opening toward the respective receptacles of the interface converter.

7. The adapter system as recited in claim 2, wherein
the movement regulator partially projects out of the standard adapter in the first direction when the movement regulator is attached to the interface converter which is attached to the standard adapter.

8. The adapter system as recited in claim 1, wherein
the interface converter partially projects out of the standard adapter in the first direction when the interface converter is attached to the standard adapter.

* * * * *